United States Patent
Gaisser et al.

[19]

[11] Patent Number: 6,104,295
[45] Date of Patent: Aug. 15, 2000

[54] ELECTRONIC BAND TAG AND METHOD OF STORING ID INFORMATION THEREIN

[75] Inventors: Gary T. Gaisser, Kingsley; Edward T. Schmitt, Acme; Hall T. Snowday, III, Traverse City; Henry J. Tenarvitz, Suttons Bay, all of Mich.

[73] Assignee: Versus Technology, Inc., Traverse City, Mich.

[21] Appl. No.: 09/119,466

[22] Filed: Jul. 20, 1998

[51] Int. Cl.[7] .................................................. G08B 13/181
[52] U.S. Cl. .................................... 340/573.4; 340/572.8; 340/572.9
[58] Field of Search .............................. 340/572.8, 572.9, 340/573.4

[56] References Cited

U.S. PATENT DOCUMENTS

| | | |
|---|---|---|
| 4,157,540 | 6/1979 | Oros . |
| 4,462,022 | 7/1984 | Stolarczyk . |
| 4,694,284 | 9/1987 | Leveille et al. . |
| 4,853,692 | 8/1989 | Wolk et al. . |
| 4,906,853 | 3/1990 | Linwood et al. . |
| 4,924,211 | 5/1990 | Davies . |
| 4,973,944 | 11/1990 | Maletta . |
| 4,982,176 | 1/1991 | Schwarz . |
| 5,017,794 | 5/1991 | Linwood et al. . |
| 5,027,314 | 6/1991 | Linwood et al. . |
| 5,115,223 | 5/1992 | Moody . |
| 5,119,104 | 6/1992 | Heller . |
| 5,218,344 | 6/1993 | Ricketts . |
| 5,228,449 | 7/1993 | Christ et al. . |
| 5,276,496 | 1/1994 | Heller et al. . |
| 5,283,549 | 2/1994 | Mehaffey et al. . |
| 5,301,353 | 4/1994 | Borras et al. . |
| 5,355,222 | 10/1994 | Heller et al. . |
| 5,387,993 | 2/1995 | Heller et al. . |
| 5,416,468 | 5/1995 | Baumann ............................. 340/573.1 |
| 5,471,197 | 11/1995 | McCurdy et al. . |
| 5,512,879 | 4/1996 | Stokes . |
| 5,548,637 | 8/1996 | Heller et al. . |
| 5,557,259 | 9/1996 | Musa . |
| 5,570,079 | 10/1996 | Dockery . |
| 5,572,195 | 11/1996 | Heller et al. . |
| 5,578,989 | 11/1996 | Pedtke . |
| 5,621,384 | 4/1997 | Crimmins et al. . |
| 5,627,520 | 5/1997 | Grubbs et al. . |
| 5,686,882 | 11/1997 | Giani . |
| 5,729,203 | 3/1998 | Oka et al. . |
| 5,742,233 | 4/1998 | Hoffman et al. . |

*Primary Examiner*—Glen Swann
*Attorney, Agent, or Firm*—Brooks & Kushman P.C.

[57] ABSTRACT

An electronic band tag includes a plurality of conductive wires supported within a band of material wherein each of the wires provide either an open circuit or a closed circuit to form a coded pattern of open and closed circuits. After an electrical discontinuity has been formed in at least one of the wires, the coded pattern of the wires is converted into a unique tag ID. The band tag utilizes both the radio frequency (RF) and infrared (IR) parts of the electromagnetic spectrum to enable a system including multiple tags to locate subjects (i.e. objects and persons) within a tracking environment. Each band tag includes a battery-operated, microprocessor-based electronic circuit for each subject to be located. Each band tag automatically transmits digitized infrared light signals to provide a fine determination of its subject's location. Each band tag transmits RF and IR signals upon actuation of a page request/alert push button switch on its electronic circuit. An RF signal is also generated at a timed interval as a "heartbeat" pulse. This pulse informs a host computer that the band tag is both present and fully functional. The IR and RF signals are modulated or encoded with the unique tag, identification data, page request or alert notification data, and battery condition data. The band tags are particularly useful in hospital systems which determine and monitor the location of patients and/or critical equipment.

11 Claims, 2 Drawing Sheets

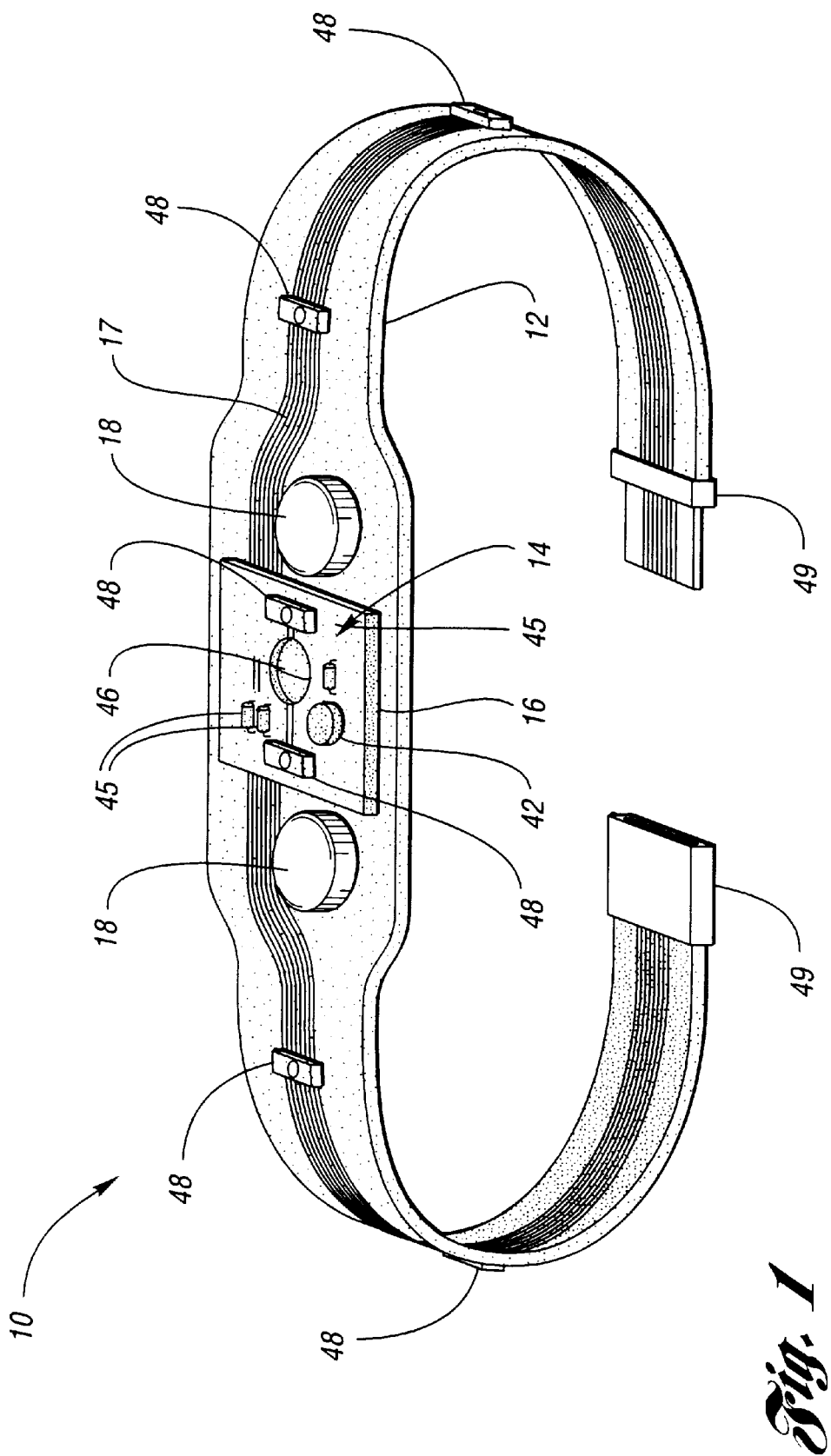

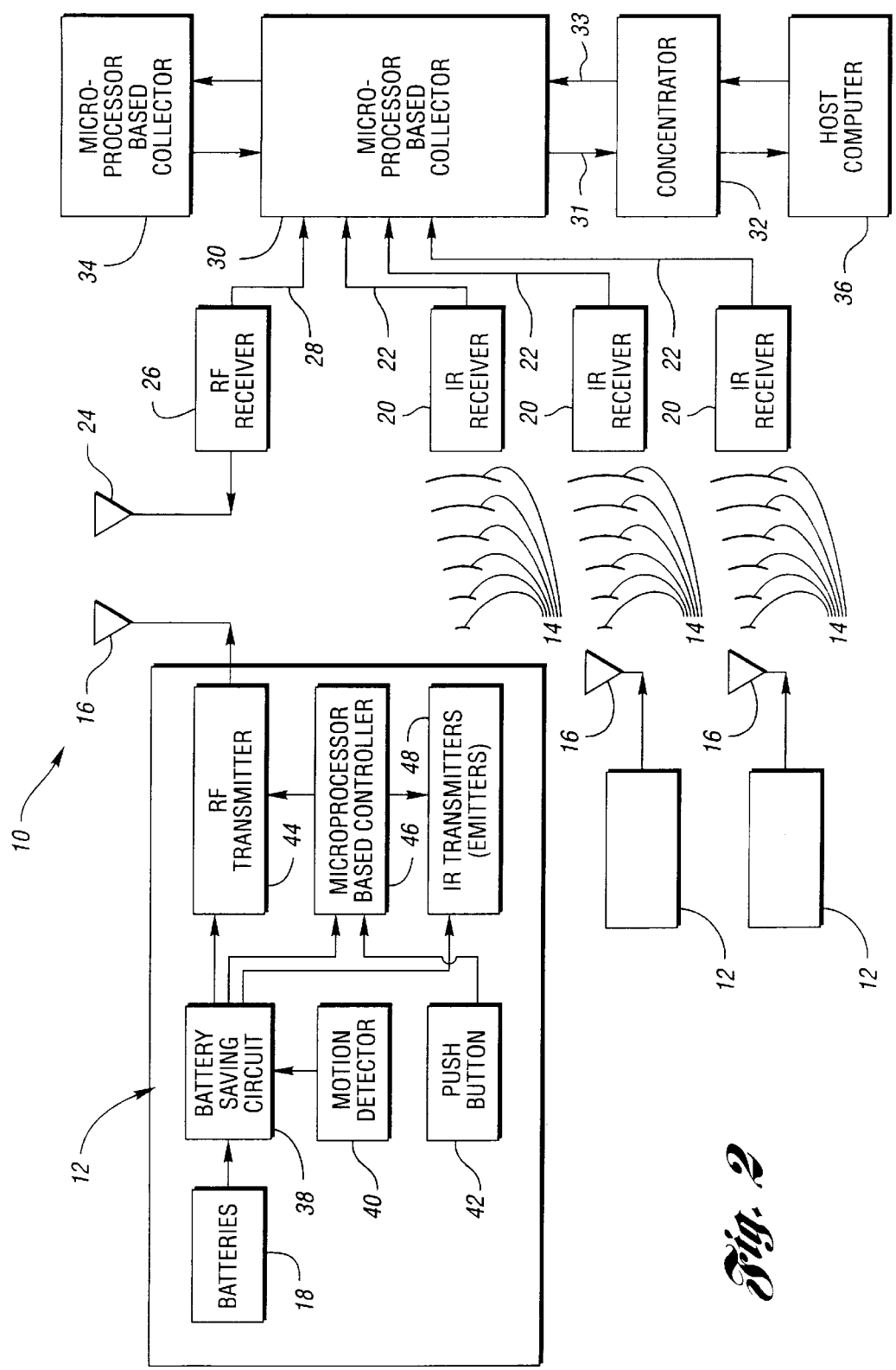

ELECTRONIC BAND TAG AND METHOD OF STORING ID INFORMATION THEREIN

TECHNICAL FIELD

This invention relates to electronic band tags and method of storing ID information therein and, in particular, to disposable electronic band tags which transmit at least one wireless signal including a unique tag ID and method of storing such ID information in the band tag.

BACKGROUND ART

It is desirable to monitor patient location and status inside of a healthcare facility. A healthcare facility has hundreds or even thousands of halls, examination rooms, patient rooms, lobbies, waiting rooms, operating rooms, washrooms, and the like where a patient may be located. Monitoring the location and the length of time spent in that location is of critical importance.

Typically, a transmitting tag is designed to be of a size which would accommodate a battery large enough to last perhaps about a year. Installation of a motion sensor to conserve and extend battery life is also typically employed. The tags are relatively expensive, and are designed to last as long as feasible so they could be used over and over again by differing personnel or items of equipment.

It is desirable to have inexpensive wristbands that may be placed on patients upon their arrival at the facility and discarded when they depart.

U.S. Pat. No. 5,512,879 to Stokes is directed to an RF transmitter tag which is connected to an infant, preferably by wrapping around the infant's leg. The transmitter is activated once it is attached by removal of a conducting material.

U.S. Pat. No. 4,157,540 to Oros shows a wireless RF alarm system worn as a belt. The system is energized only when the belt is buckled to complete the circuit.

U.S. Pat. No. 4,973,944 to Maletta shows a proximity RF wristband which is activated when it is placed on the wrist of a person being monitored using a rivet which completes a circuit between opposite ends of the band.

U.S. Pat. No. 4,853,692 to Wolk et al. shows an infant security system using a strap with a metallic wire to complete an RF transmitter circuit when it is attached.

U.S. Pat. No. 4,694,284 to Leveille et al. shows an abduction prevention collar with RF circuitry in the strap portion of the device.

U.S. Pat. No. 5,621,384 discloses an infrared badge including an infrared transparent segment for use on a user's wrist. The badge is for use in a hospital and is disposable.

The following U.S. patents further show the state of the art of remotely worn location indicators: U.S. Pat. Nos. 5,115,223; 5,471,197; 5,557,259; 5,627,520; 5,686,882; 5,729,203; and 5,742,233.

U.S. Pat. No. 5,301,353 to Borras et al. discloses a communication system and apparatus wherein the system utilizes one of two different types of communication methods, depending on the location of the user. When the user is in an on-site area, the user communicates via infrared techniques. When the user is in an off-site area, the user communicates using a different communication medium, including an RF communication media.

U.S. Pat. No. 5,218,344 to Ricketts discloses a method and system for monitoring personnel in a facility, wherein the system utilizes two different types of communication devices. The system includes a central computer, a plurality of remotely located stationary transceivers, and a portable transceiver unit worn by each monitored individual. In operation, the main computer transmits command signals to a plurality of stationary transceivers using hardwire communication of acoustic, electromagnetic or optical communications. The stationary transceivers then broadcast interrogation signals to the portable transceiver units. The interrogation signals are transmitted via acoustic, electromagnetic or optical transmission methods. The method and system provides a verification of the location of individuals wearing the portable transceiver units.

U.S. Pat. No. 5,228,449 to Christ et al. discloses a system and method for detecting out-of-hospital cardiac emergencies and summoning emergency assistance. The system includes an infrared patient detecting system and an RF communication system. In operation, the infrared system is used to detect the presence and health of the patient. The infrared system provides information to the RF transmitter, which transmits the information to a central computer. The operator of the central computer is then able to monitor the health and presence of the patient via the infrared and radio frequency communication links.

U.S. Pat. No. 4,924,211 to Davies and U.S. Pat. No. 5,416,468 to Baumann disclose systems and methods for monitoring personnel, wherein the systems comprise both infrared and radio frequency communication devices.

U.S. Pat. Nos. 4,462,022; 4,982,176; 5,570,079; 5,283,549; and 5,578,989 show security systems using local infrared detecting devices which communicate with a central monitoring station via a radio frequency communication link.

U.S. Pat. No. 5,027,314 discloses a system and method for tracking a number of subjects in a plurality of areas. The system includes a plurality of transmitters associated with the subjects, a plurality of receivers associated with the areas and a centralized processor for determining in which of the areas the transmitter and, consequently, the subjects are located. Each transmitter transmits a light-based signal, such as an infrared signal, representative of an identifying code unique to the transmitter. Each receiver validates the signal to determine whether the signals are representative of the unique identifying codes associated with the transmitters. The centralized processor records the validated signals and receivers, scans the receivers and accumulates areas and badge counts for each area.

U.S. Pat. No. 5,548,637 discloses an automated method and system for providing the location of a person or object (i.e. a subject) in the form of a message in response to a telephone caller's inquiry. The method and system may connect the caller directly to the telephone extension located nearest the subject of interest. A transmitter, such as an infrared transmitter, is attached to each subject to be monitored within a defined area such as a building. A number of receivers or sensors track the location of the subject within the building. The locations are stored in a database. In one form of the invention, as each transmitter is transported throughout the building, the system continually updates the transmitter location in the database.

U.S. Pat. No. 5,572,195 discloses a method and system for tracking an locating objects wherein the system includes a computer network, such as a local area network, a computer connected to the computer network, infrared sensors, and interface circuitry connecting the computer network to the infrared sensors. The infrared sensors are adapted to receive unique identifying codes from infrared transmitters and then provide the codes to the interface circuitry. In turn, the codes are then provided to the computer network. The invention may be implemented using an object identifier variable-based protocol such as SNMP (Simple Network Management Protocol). The system may include an external device controller, such as a relay controller, for controlling a physical device such as an electronic door lock within the environment.

U.S. Pat. No. 5,387,993 discloses various methods of transmitting data and control information such as battery life for badges (TAGs) to optical (i.e. infrared) receivers of an optical locator system. In one of the methods, the badges are "motion-detectable" and have a sleep mode. The badges are reprogrammable with identifying information about the objects to which they are attached. Each badge activates the sleep mode, thereby reducing its normal power consumption. Each TAG will reactivate the sleep mode when motion is detected by the motion detector, thereby returning the battery power level to normal.

U.S. Pat. No. 5,119,104 discloses a radio-location system for multipath environments, such as for tracking objects in a facility, includes an array of receivers distributed within the tracking area, coupled to a system processor over a LAN. A TAG transmitter located with each object transmits, at selected intervals, spread spectrum TAG transmissions including at least a unique TAG ID. Object location is accomplished by time-of-arrival (TOA) differentiation, with each receiver including a TOA trigger circuit for triggering on arrival of a TAG transmission, and a time base latching circuit for latching the TOA count from an 800 MHZ time base counter. In a low resolution embodiment, each receiver of the array is assigned a specific location-area, and receives TAG transmissions almost exclusively from TAGs located in that area, thereby eliminating the need for any time-of-arrival circuitry.

U.S. Pat. No. 5,276,496 discloses an optical receiver for use with an optical location system that locates a target in a defined area. A spherical lens is placed over the area. The area is divided into sections, with a sensor associated with each section. These sensors receive light transmitted through the lens, and are positioned relative to each other and with respect to the lens, such that each sensor receives emitted light from the same size section if the target is located in its section. The height of each sensor may be adjusted so that each sensor receives light of the same intensity if the target is located in its section.

U.S. Pat. No. 5,355,222 discloses an optical location system for locating the position of a moving object in a defined area. An optical transmitter is attached to the moving object. A stationary receiver has a number of sensors for receiving a signal from the transmitter. One sensor has a field of view of the entire area. Other sensors have partially blocked fields of view, with the blocking being accomplished with nonopaque strips of decreasing width. These strips are arranged so that the detection or nondetection of light by the sensors can be digitally coded in a manner that corresponds to sections of the area.

U.S. Pat. No. 4,906,853 discloses a control apparatus for triggering a periodic pulse at random times comprising a timer for variably issuing the periodic pulse in a defined time cycle and a signal generator for variably generating an output voltage within the defined cycle. The signal generator has a light sensitive component for varying in time the generation of the output voltage in proportion to the intensity of visible light incident on the light sensitive component. The apparatus also includes a circuit for applying the generated output voltage to the timer for triggering the issuance of the periodic pulses.

U.S. Pat. No. 5,017,794 discloses apparatus including a timer for generating a periodic pulse in a defined time cycle in response to a control signal, and a signal generator for variably generating the control signal within the defined cycle. The signal generator includes a light sensitive component for varying in time the generation of the control signal in proportion to the light incident on the light sensitive component for a portion of the defined cycle.

SUMMARY OF THE INVENTION

An object of the present invention is to provide an inexpensive, disposable, electronic band tag and method of storing ID information therein wherein the ID information is stored as a coded pattern of open and closed circuits of wires which are supported within a band of material of the electronic band tag.

Another object of the present invention is to provide an electronic band tag which wirelessly transmits ID information and a method of storing the ID information therein wherein the band tag is disposable, relatively inexpensive and easy to program with the ID information.

In carrying out the above objects and other objects of the present invention, an electronic band tag is provided. The electronic band tag includes a band of material and a plurality of conductive wires supported within the band so that the conductive wires are insulated from one another. The band tag also includes an electronic circuit electrically coupled to the wires to convert a coded pattern of open and closed circuits of the wires into a unique tag ID. The electronic circuit also transmits at least one wireless signal including the unique tag ID.

Preferably, the electronic circuit transmits both a substantially line-of-sight signal including the unique tag ID and a substantially non-line-of-sight signal also including the unique tag ID.

Also, preferably, the band is a wrist band made of a plastic material such as vinyl.

Still further in carrying out the above objects and other objects of the present invention, a method of storing ID information in the above-noted electronic band tag is provided. The method includes the step of forming an electrical discontinuity in at least one of the plurality of conductive wires of the band tag to form a coded pattern of open and closed circuits of the wires.

The band tag typically employs a plurality of very small and inexpensive batteries capable of lasting only approximately 100 hours of operation—which is generally enough to cover the length of an average patient's stay at the hospital. However, it is to be understood that through a change in battery configuration, the band tag may have many tag lives. Hence, the band tag is smaller and more lightweight. Unlike conventional tags, each tag may comfortably be worn on a person's wrist.

Also, the cost of manufacture of each tag is greatly reduced.

Further, each tag is designed to be disposable upon the end of the patient's stay at the hospital, thereby eliminating the need to sanitize or service the band tag before reusing it with another person.

Each band tag also is designed so that its power circuit is first closed when the wrist band is first attached to a patient with a clasp; and the power circuit is permanently broken when the clasp is undone, or when the band tag is severed, or is otherwise removed from the patient's wrist.

Hence, unlike conventional tags, the battery life of the tag is preserved while the tag sits unused in inventory.

Also, the energizing of the tag is automatic when placed on the object to be tracked, thereby solving the problem of inadvertent failure to close the circuit of the tag to commence operation.

Further, the tag may not be removed (circuit broken) without sending an alarm, thus notifying others that the object intended to be tracked is no longer connected with the tag. This would have application not only for uncooperative hospital patients, but also for security and law enforcement applications outside a hospital.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is an environmental view of an electronic band tag constructed in accordance with the present invention; and FIG. 2 is a schematic block diagram illustrating a system for incorporating a plurality of band tags of FIG. 1.

BEST MODE FOR CARRYING OUT THE INVENTION

Referring now to FIG. 1, there is illustrated an electronic, battery-operated, band tag, generally indicated at 10, which is constructed in the form of a wrist band adapted to be attached to a patient's wrist. The band tag 10 is typically designed to have a short life, is inexpensive and disposable. Each band tag 10 utilizes both the radio frequency (RF) and infrared (IR) parts of the electromagnetic spectrum to locate its subject (i.e., object and/or person) within a tracking environment such as a hospital.

The band tag 10 includes a band of plastic material such as a standard vinyl patient wrist band 12 and an electronic circuit, generally indicated at 14, shown mounted on a circuit board 16 within the band 12.

The band tag 10 also includes a plurality of thin, parallel, conductive wires 17, typically eight in number, which are supported within the band material 12 so that the conductive wires 17 are insulated from one another. Each of the wires 17 typically provides either an open circuit or closed circuit, thereby storing ID information therein as will be further described hereinbelow.

Referring now to FIGS. 1 and 2, the electronic circuit 14 includes a microprocessor-based controller 46 which may take the form of an ASIC which is electrically coupled to the wires 17 to convert a coded pattern of open and closed circuits of the wires into a unique tag ID. Preferably, the electronic circuit 14 also includes an RF transmitter 44, resistors of which are shown at reference numeral 45 in FIG. 1. The RF transmitter 44 transmits a substantially non-line-of-sight signal including the unique tag ID.

The electronic circuit 14 also includes a plurality of IR transmitters 48, as indicated in FIG. 2, which take the form of a plurality of infrared emitting diodes spaced about the band 12, as illustrated in FIG. 1. The IR transmitters 48 transmit substantially line-of-sight signals also including the unique tag ID.

A power circuit including a plurality of batteries 18 of the electronic circuit 14 is completed by fastening complementary parts of a clasp 49 which may take various forms as is well known in the art. The plurality of batteries 18 are typically small, button cell batteries. While two such batteries are illustrated in FIG. 1, it is to be understood that preferably 4–8 such batteries 18 are provided for the electronic circuit 14.

Typically, one or more of the electrical wires 17 supported within the band 12 are broken to form an electrical discontinuity in selected ones of the wires 17 to form a coded pattern of open and closed circuits of the wires. In other words, each of the wires 17 provides either an open circuit or a closed circuit which the microprocessor-based controller 46 converts into a unique tag ID for a particular patient. Such an electrical discontinuity can be formed in a particular wire 17 such as by punching a hole through the band 12 and the particular wire 17, thereby breaking the wire 17 into two parts wherein the two parts are electrically isolated from one another.

Referring now to FIG. 2, there is illustrated a system, generally indicated at 11, for locating subjects (i.e. persons and objects) in a tracking environment and which utilizes a plurality of electronic band tags 10 of the present invention. In general, the system 11 is a combined infrared and radio frequency locating system which is adapted for use not only in medical applications, but also in non-medical applications. The system 11 provides a fully automatic data collection system which provides real-time location information of personnel or equipment (i.e. subjects). Typically, information is collected using an in-ceiling and/or in-wall sensor network connected with common telephone-type wire to make accurate decisions and execute the appropriate responses. Typically, the components of the system 11 are relatively simple and modular.

In general, the system 11 includes a plurality of the electronic band tags 10. A band tag 10 is provided for each subject to be tracked within the tracking environment. In general, each tag 10 emits a plurality of hemispheres of digitally encoded infrared (i.e. IR) light as indicated by lines 13. Preferably, the digitally encoded infrared light includes a 42 bit packet having a fixed 16 bit ID plus other network information. Typically, the effective range of such infrared light is approximately 15 to 18 feet. The infrared light is a substantially line-of-sight signal.

Each band tag 10 also transmits or emits a radio frequency (i.e. RF) signal via an antenna 15 also supported within the band 12 (but not shown in FIG. 1). The digitized infrared light and the radio frequency interlace contain tag identification data, page request or alert notification, and condition of the batteries 18 contained within each of the band tags 10.

An RF signal is also generated at a timed interval as a "heartbeat" pulse. This pulse informs a host computer 36 that the tag is both present and fully functional.

The system 11 also includes a receiver assembly including a plurality of infrared receivers 20 which are utilized to receive the tags' infrared signals and transmit coded transmission data along twisted pair connections 22.

The radio frequency signals emitted by the antennas 15 are received by an antenna 24 of a radio frequency receiver 26 which comprises a sensor having a range of approximately 100 to 200 feet in all directions. The radio frequency receiver 26 converts encoded signals emitted by the band tags 10 into electrical signals which are transmitted via a single twisted pair connection 28.

The signals appearing along the connection 28 as well as the connections 22 are received by a microprocessor-based collector 30 of the receiver assembly which takes the incoming data packets, buffers them and prepares them for transfer to a concentrator 32 of the system 11. The collector 30 assembles data received from the receivers 20 and 26 into a larger network-ready packet. This network-ready packet is then relayed along a twisted wire pair 31. Typically, software for the collector 30 is uploaded via the concentrator 32 along a connection 33. Typically, the microprocessor-based collector 30 can be connected with up to 24 sensors or receivers such as the receivers 20 and the receiver 26.

The concentrator 32 typically scans the collector 30 as well as any other collectors such as a collector 34 connected in a single daisy chain or multi-drop configuration to the concentrator 32. In turn, the collector 34 is connected to other receivers (not shown) of the infrared and RF types.

The system 11 also includes appropriately programmed host computer 36 which receives and processes data packets collected by the concentrator 32.

Each band tag 10 also includes a push button 42 which is manually operable and can be used to request pages or to send alerts by means of a radio frequency transmitter 44 under the control of a microprocessor-based controller 46. While the infrared transmissions from the band tags 10 are location specific since infrared signal transmissions do not penetrate walls or floors, the radio frequency signals transmitted or emitted by each radio frequency transmitter 44 under the control of its controller 46 do penetrate walls and floors. Each radio frequency transmitter 44 produces supervisory signals approximately every two minutes and page request/alert signals substantially instantaneously upon depression of its respective push button 42.

The microprocessor-based controller or ASIC 46 controls the RF transmitter 44 to modulate data including preset, unique identification codes (i.e. TAG ID). For example, a radio frequency data modulation routine provided by the controller 46 typically holds an oscillator contained within the RF transmitter 44 on the entire period the push button 42 is depressed. Preferably, the RF transmitter 44 under the control of the controller 46 uses frequency shift keyed modulation.

In like fashion, an IR transmitter or emitter 48 of each band tag 10 under control of the controller 46 modulates the IR transmissions from the transmitter 48. For example, a 447.5 kHz signal, when emitting a carrier on pulse, will turn the LEDs 48 of the transmitter 48 on and off for so many microseconds (typically 120 microseconds).

The RF receiver 26 typically uses modulating current loop transmission signaling technology for high reliability. Typically, the receiver 26 can be located up to 1,000 feet from its associated collector 30 using standard unshielded twisted pair telephone-type wire. While the receiver 26 and the receivers 20 are typically mounted in acoustic tile, they may be also mounted on walls or other convenient locations.

The modulation process provided for each band tag 10 by its controller 46 is reversed within each microprocessor-based collector 30. Each collector 30 removes the subcarrier from the signals appearing on connections 28 and 22, thereby leaving the data as demodulated serial data. The microprocessor within the collector 30 then demodulates the ID data received. It then passes this data upstream such that the only relevant information that the signal came from a radio frequency receiver such as the radio frequency receiver 26 or an infrared receiver such as one of the infrared receivers 20 is determined by the software contained within the host computer 36 when the particular receivers 26 and 20 are programmed into the system 11. Not only is the system 11 knowledgeable as to the type of receiver the data is received from, but also its location.

Typically, the host computer 36, when appropriately programmed, can process the last known infrared location for purposes of servicing a person who has pressed a push button 42 on his associated band tag 10. For example, since bathrooms are places where it can be difficult to place infrared receivers 20 and where people may object to such a receiver being present, a push of the push button 42 by a person within such a bathroom will require the host computer 36 to find the last known infrared receiver reception (which is likely to be outside the restroom). Hence, the proper service can be delivered to the person who pressed the push button 42.

While the best mode for carrying out the invention has been described in detail, those familiar with the art to which this invention relates will recognize various alternative designs and embodiments for practicing the invention as defined by the following claims.

What is claimed is:

1. An electronic band tag comprising:

a band of material;

a plurality of conductive wires supported within the band so that the conductive wires are insulated from one another; and an electronic circuit electrically coupled to the wires to convert a coded pattern of open and closed circuits of the wires into a unique tag ID, the electronic circuit transmitting at least one wireless signal including the unique tag ID wherein the electronic circuit includes a first transmitter for transmitting a substantially line-of-sight signal including the unique tag ID and a second transmitter for transmitting a substantially non-line-of-sight signal also including the unique tag ID.

2. The band tag as claimed in claim 1 wherein the conductive wires are substantially parallel to each other.

3. The band tag as claimed in claim 1 wherein the band is a wrist band.

4. The band tag as claimed in claim 1 wherein the material of the band is a plastic.

5. The band tag as claimed in claim 1 wherein the line-of-sight and non-line-of sight signals are electromagnetic signals.

6. The band tag as claimed in claim 5 wherein the non-line-of-sight signal is a radio frequency (RF) signal.

7. The band tag as claimed in claim 6 wherein the line-of-sight signal is an infrared (IR) signal.

8. The band tag as claimed in claim 7 wherein the second transmitter is an RF transmitter for transmitting the RF signal, the first transmitter is an IR transmitter for transmitting the IR signal and the electronic circuit further includes a single controller for controllably modulating both the RF and IR signals with the unique TAG ID.

9. The band tag as claimed in claim 8 wherein the single controller is a microprocessor-based controller.

10. A method of storing ID information in an electronic band tag, the electronic band tag including a band of material; a plurality of conductive wires supported within the band so that the conductive wires are insulated from one another; and an electronic circuit electrically coupled to the wires to convert a coded pattern of open and closed circuits of the wires into a unique tag ID, the electronic circuit transmitting at least one wireless signal including the unique tag ID, the method comprising the step of:

forming an electrical discontinuity in at least one of the conductive wires to form a coded pattern of open and closed circuits of the wires.

11. An electronic band tag comprising:

a band of material;

a plurality of substantially parallel conductive wires supported within the band so that the conductive wires are insulated from one another; and an electronic circuit electrically coupled to the wires to convert a coded pattern of open and closed circuits of the wires into a unique tag ID, the electronic circuit transmitting at least one wireless signal including the unique tag ID.

* * * * *